United States Patent [19]

Taniguchi, Isoji et al.

[11] Patent Number: 4,731,437
[45] Date of Patent: Mar. 15, 1988

[54] PROCESS OF PREPARING ORGANOBORON NITRIDE POLYMER

[76] Inventors: Taniguchi, Isoji, 17-12, 2-chome, Takeshirodai,, Sakai-shi, Osaka-fu; Yoshiharu Kimura, 1126, Takakai-cho, Ohmihachiman-shi, Shiga-Ken; Yamamoto, Kenji, Seisen-Ryo, 1820, Ohaza-Yoshida, Ohizumi-cho, Ohra-gun, Gunma-ken, all of Japan

[21] Appl. No.: 762,935

[22] Filed: Aug. 6, 1985

[30] Foreign Application Priority Data

Aug. 11, 1984 [JP] Japan ............................. 59-168454

[51] Int. Cl.$^4$ ............................................. C08G 79/08
[52] U.S. Cl. ..................................... 528/394; 528/7; 528/20; 528/30
[58] Field of Search .................. 528/7, 394, 21, 20, 528/30, 22

[56] References Cited

U.S. PATENT DOCUMENTS 3,052,641  9/1962  McCloskey et al. ................... 528/7
4,550,151  10/1985  Takamizawa et al. ................ 528/7

FOREIGN PATENT DOCUMENTS 1018031  1/1966  United Kingdom ................... 528/7

Primary Examiner—Wilbert J. Briggs, Sr.
Attorney, Agent, or Firm—Abelman Frayne Rezac & Schwab

[57] ABSTRACT

Organoboron nitride polymers are produced by polymerization of organoboron nitride compounds having a cyclic structure of the formula $(XBNR)_3$ wherein R represents hydrogen, a saturated or unsaturated alkyl group or an aryl group and X represents a primary, secondary or tertiary amino group or a silylamino group in the presence of at least one of amine compounds of the formula $R^1NH_2$ and amine compounds of the formula $R^1NHR^2$ wherein $R^1$ and $R^2$ which may be the same or different individually represent an alkyl, aryl or silyl group. The organoboron nitride polymers are suitable as a raw material for the production of boron nitride and as a binder for boron nitride powders.

8 Claims, 2 Drawing Figures

FIG. I

PROCESS OF PREPARING ORGANOBORON NITRIDE POLYMER

FIELD OF THE INVENTION

This invention relates to new processes of preparing organoboron nitride polymers.

BACKGROUND OF THE INVENTION

In addition to its high melting points, excellent electrical characteristics and mechanical properties, boron nitride has such preferable properties that it is hardly attacked by oxygen, chemicals or the like, and hence products of boron nitride such as fibers, films, moldings and the like now attract keen interests of various fields of industry. The products are used for various purposes, for example, reinforcing materials for composite materials, diaphragm for fused salt cells, electronic parts and the like.

Because of the high melting point of boron nitride, however, it is difficult to prepare fibers, films or moldings directly from boron nitride by the fusion thereof. Under such circumstances, known processes for obtaining fibers, films or moldings of boron nitride generally include a process by sintering fibers, films or moldings which are previously prepared from organoboron nitride polymers and a process by using organoboron nitride polymers as binders for boron nitride powders to prepare films or various types of moldings comprising a mixture of boron nitride powders and organoboron nitride polymers, followed by sintering.

As processes for preparing such organoboron nitride polymers suitable for use in forming fibers, films or moldings thereof or for use as binders for boron nitride powders as mentioned above, there has heretofore been known only a process in which borazine derivatives are singly subjected to heat polymerization. In the practice of this process, however, there was often observed formation of cross-linked polymers which were infusible or insoluble, and it was relatively difficult to produce excellent polymers for use in forming the above-mentioned fibers, films or moldings thereof or for use as binders for boron nitride powders.

SUMMARY OF THE INVENTION

Now, we have found that a heat polymerization of borazine derivatives is carried out in the presence of one or more amine compounds as defined below, whereupon the polymerization quickly proceeds by the action of said amine compound or compounds, thus providing less formation of such cross-linked polymers as mentioned above, less growth of networking of the borazine ring and large percentages of the organic radicals contained in the organoboron nitride polymers even in the formation of fresh B-N bonds, so that excellent polymers suitable for molding purposes are prepared efficiently and readily.

BRIEF DESCRIPTION OF THE DRAWINGS

The present invention will now be described in more detail with reference to the accompanying drawings, in which.

DETAILED DISCLOSURE OF THE INVENTION

Figure 1:
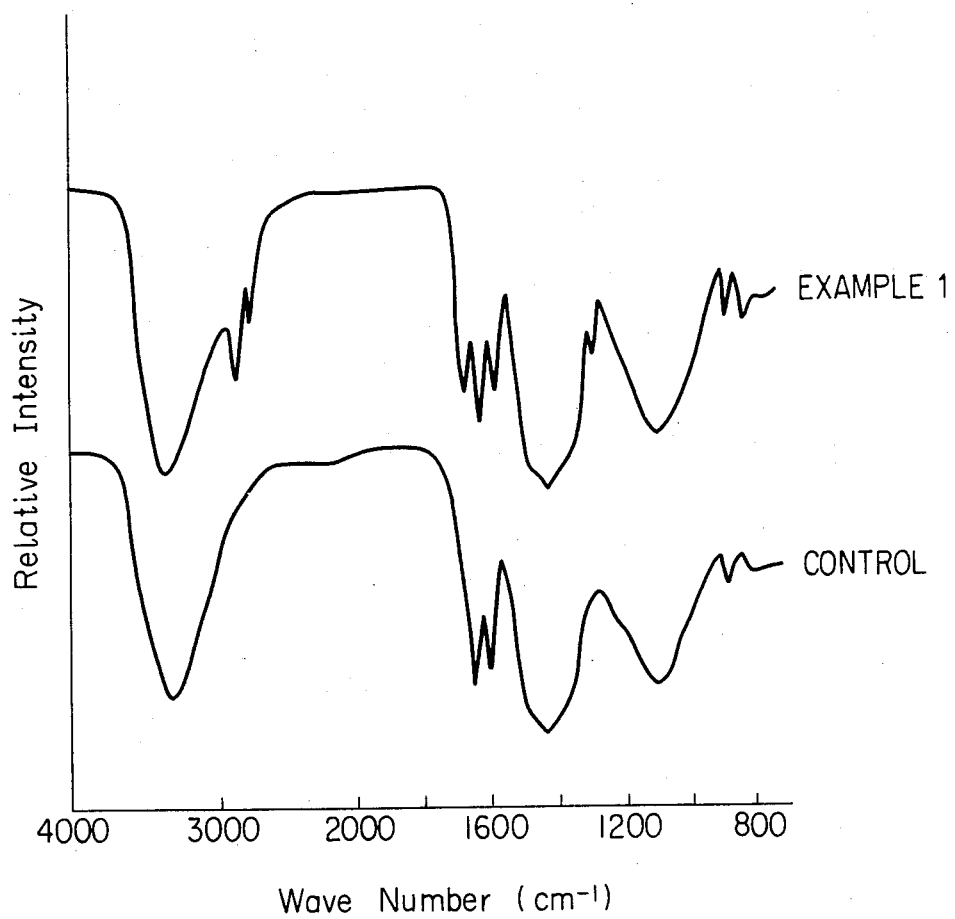
FIG. 1 is infrared absorption spectra of the organoboron nitride polymer as prepared in Example 1 below and the polymer (control) as prepared by a known process wherein the polymerization is carried out in the absence of the amine compound.

According to the present invention, there is provided a process of producing an organoboron nitride polymer which comprises polymerizing an organoboron nitride compound having a cyclic structure of the formula $(XBNR)_3$ (which is called generically "borazine derivatives") wherein R represents hydrogen, a saturated or unsaturated alkyl group, or an aryl group and X represents a primary, secondary or tertiary amino group, or a silylamino group, in the presence of at least one of an amine compound of the formula $R^1NH_2$ and an amine compound of the formula $R^1NHR^2$ wherein $R^1$ and $R^2$ which may be the same or different individually represent an alkyl group, an aryl group or a silyl group.

It is generally said that elevated temperatures as high as 1700°–1800° C. are required for the preparation of boron nitride of hexagonal system by sintering, e.g., amorphous boron nitride or organoboron nitride compounds prepared by known processes, etc. However, boron nitride obtained by firing the polymers prepared by the processes of the present invention had a structure of hexagonal system even at a sintering temperature of from 1000° to 1400° C.

In the organoboron nitride compounds of the formula $(XBNR)_3$ used in the present invention, typical examples of the alkyl group represented by R include, as a saturated alkyl group, methyl, ethyl, n-propyl, isopropyl, n-butyl and isomers thereof (e.g., isobutyl, secondary butyl, tertiary butyl, etc.) and n-pentyl and its isomers (e.g., isopentyl, neopentyl, etc.). As an unsaturated alkyl group, there may be mentioned vinyl, n-propenyl, isopropenyl, n-butenyl and isobutenyl. Representatives of an aryl group include phenyl, tolyl and the like.

Furthermore, as the amino group represented by X, there may be mentioned a primary amino group having the $NH_2$ structure, a secondary amino group having the $NHR^3$ structure, and a tertiary amino group having the $NR^3R^4$ structure, wherein $R^3$ and $R^4$, which may be the same or different, individually represent various alkyl or aryl groups as mentioned above for R, or a silyl group represented by $-SiR^5R^6R^7$ wherein $R^5$, $R^6$ and $R^7$, which may be the same or different, individually represent alkyl or aryl. As representatives of the silyl group, there may be mentioned trimethylsilyl, triethylsilyl, triphenylsilyl, dimethylphenylsilyl, etc.

In the present invention, the organoboron nitride compounds as defined above may be used either alone or in admixture of two or more.

The amine compounds used for the polymerization of the organoboron nitride compounds are those having the formula $R^1NH_2$ or $RN^1NHR^2$ wherein $R^1$ and $R^2$, which may be the same or different, individually represent an alkyl, aryl or silyl group. Representatives of the $R^1$ and $R^2$ substituents include various alkyl groups such as methyl, ethyl, n-propyl, isopropyl, n-butyl and isomers thereof, n-pentyl and isomers thereof and n-hexyl and isomers thereof, various aryl groups such as phenyl, tolyl and various silyl groups having a structure of $SiR^8R^9R^{10}$ wherein $R^8$, $R^9$ and $R^{10}$, which may be the same or different, individually represent the same alkyl or aryl group as mentioned above for R. It was recognized in this connection that preferable influences are exerted on the products resulting from the polymerization of the organoboron nitride compounds conducted in the presence of the amine compounds having particularly such long chain alkyl as lauryl or stearyl. These amine compounds may also be used either alone or in admixture of two or more. The amount of the amine compound added is preferably in the range of from 0.003 to 0.3 mol per one mol of the organoboron nitride compounds.

Though the polymerization reaction of the present organoboron nitride compounds proceeds with or without solvents, it is easy to control the reaction if the solvents are used. For this purpose, any solvents are effectively usable so long as they are capable of dissolving the organoboron nitride compounds as well as the amine compounds used in the present invention. The solvents include such aromatic hydrocarbons as benzene, toluene, xylene and tetralin; such ether type solvents as dioxane, 1,2-dimethoxyethane, tetrahydrofuran and anisole; such tertiary amine type solvents as pyridine, picoline and trimethylamine; and such polar solvents as dimethyl sulfoxide, dimethyl formamide.

The polymerization reaction of the organoboron nitride compounds is carried out usually at a temperature ranging from 80° to 500° C., with especially preferred range of 150° to 300° C.

The present invention is illustrated below in more detail with reference to examples, but it should be construed that the invention is in no way limited to those examples.

EXAMPLE 1

B-triamino-N-trimethylborazine (hereinafter abbreviated as "AMB") 500 mg (2.98 mmol) and laurylamine 50 mg (0.27 mmol) were charged in a glass tube and then melt by heating at 200° C. under nitrogen stream to undergo reaction for 1 hour. After completion of the reaction, 450 mg of a white powdery product were prepared. A weight loss of AMB attributable to the reaction was 19%.

As a result of analysis of the product according to the infrared absorption method, it was observed that the product contained therein a long chain alkyl group and a borazine ring. The product thus obtained was found to be a polymer melting at about 250° C. and having excellent molding properties.

In contrast thereto, the product obtained by thermally polymerizing AMB alone under the same conditions as above but in the absence of laurylamine was found to have no softening point, and a weight loss of AMB attributable to the reaction was 18%. As regards the weight loss of AMB referred to above, it was confirmed by gas chromatography of the evolving gas producing from the reaction that said weight loss was caused during said reaction by liberation of methylamine from AMB.

EXAMPLE 2

B-triamino-N-trimethylborazine 500 mg (2.98 mmol) and p-n-octylaniline 50 mg (0.24 mmol) were dissolved in 3 ml of N,N-dimethylformamide and heated for 3 hours at 150° C. under nitrogen stream. In the middle of the reaction at the point of time after the lapse of about 2.5 hours from the initiation of the reaction, the reaction system became inhomogeneous with formation of a precipitate. After the completion of the reaction, the solvent was removed under reduced pressure to give a white powdery product which was then washed with dry diethyl ether and thoroughly dried to obtain 525 mg of the product. A weight loss of AMB was 5%.

Separately, AMB was polymerized under the same conditions as above but in the absence of p-n-octylaniline, whereupon it took about 4 hours before a precipitate was formed as aforesaid. After the lapse of 5 hours from the initiation of the reaction, a weight loss of AMB was 2%.

EXAMPLE 3

B-Triamino-N-triphenylborazine (hereinafter abbreviated as "APB") 500 m (1.41 mmol) and stearylamine 50 mg (0.19 mmol) were charged in a glass tube and melt by heating at 260° C. under nitrogen stream to undergo reaction for 2 hours. The product obtained was a yellow glassy form and weighed 513 mg, and a weight loss of APB was 7.5%.

In contrast thereto, APB was thermally polymerized singly under the same conditions as above but in the absence of stearylamine, whereupon a weight loss of APB was 6%, and the product obtained was found to be lack of thermoplasticity, whereas the product of the present invention as prepared with addition of the organic amine was in a melted state at approximately 250° C.

It was confirmed by gas chromatography that the weight loss of APB was attributable to liberation of aniline from APB during the polymerization reaction thereof, likewisely to the case of AMB.

EXAMPLE 4

Example 3 was repeated except that the amount of the stearylamine used was increased to 250 mg (0.93 mmol). The product was a colorless and transparent liquid, and the yield thereof was 690 mg. A weight loss of APB was 12%.

Figure 2:
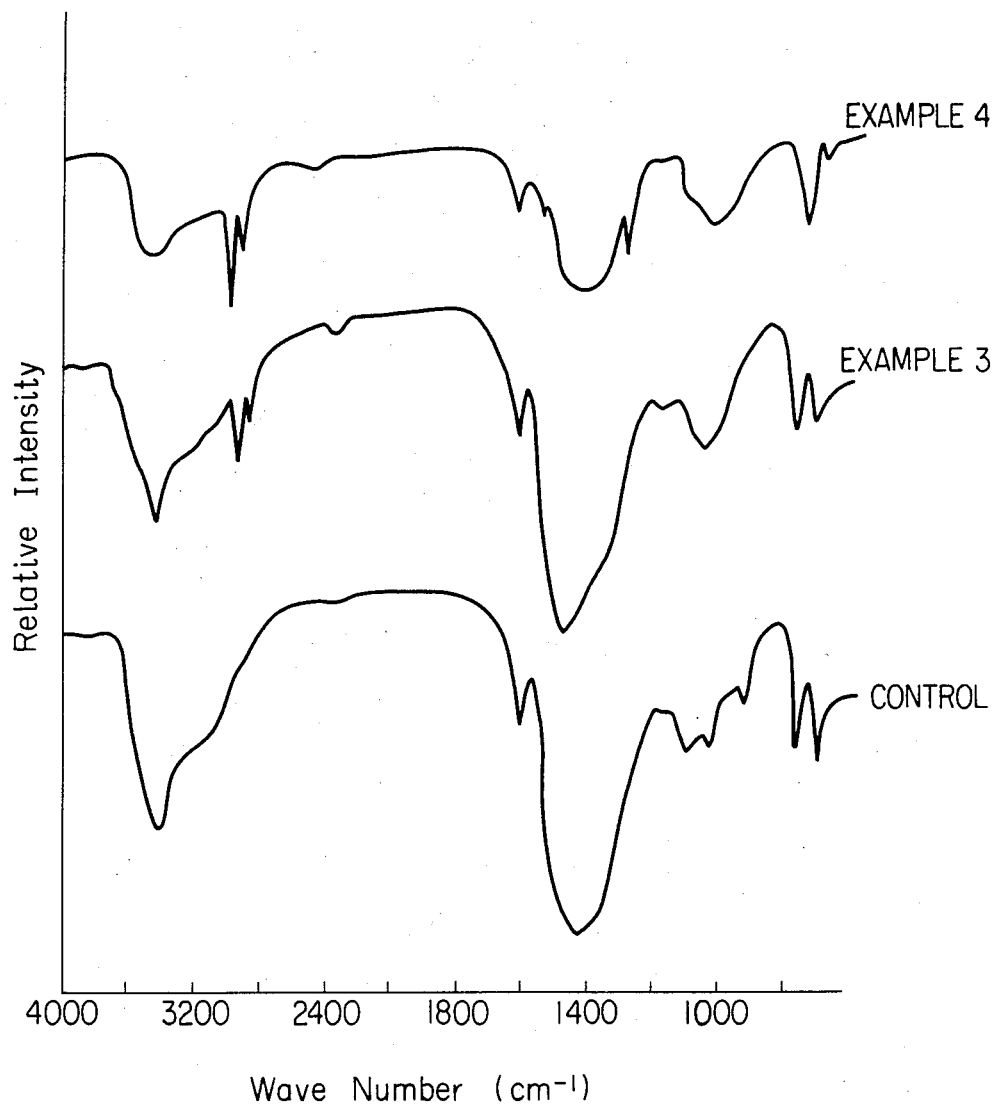
FIG. 2 is infrared absorption spectra of the organoboron nitride polymers as prepared in Examples 3 and 4 below, and the polymer (control) as prepared by said known process.

As seen from the IR absorption spectra of FIGS. 1 and 2, the organoboron nitride polymers produced by the process of the present invention is constituted with molecules having B-N bond (1430 cm$^{-1}$), C-H bond (2850 cm$^{-1}$, 2930 cm$^{-1}$) and N-H bond (3420 cm$^{-1}$. It is also found that the polymers of the present invention are characterized by the presence of the organic radicals (e.g., lauryl in Example 1, stearyl in Examples 3 and 4) in the molecules, with exhibiting the plasticizing effects and disturbing the formation of network of the borazine rings. In contrast, the polymer (control) produced by the known process in the absence of the amine compound does not show the presence of any organic radical in the structure. As also seen from the IR absorption spectrum of FIG. 2, the polymer as produced in Example 4 forms less B-N six-membered rings than that in Example 3, because the reaction with stearyl amine occurs many times.

What is claimed is:

1. A process of producing an organoboron nitride polymer which comprises polymerizing an organoboron nitride compound having a cyclic structure of the formula $(XBNR)_3$ wherein R represents hydrogen, a saturated or unsaturated alkyl group, or an aryl group and X represents $NH_2$, $NHR^3$ or $NR^3R^4$ wherein $R^3$ and $R^4$ may be the same or different and each represents and alkyl group, an aryl group or a silyl group of $-SiR^5R^6R^7$ where $R^5$, and $R^6$ and $R^7$ may be the same or different and each represents an alkyl group or an aryl group, in the presence of at least one of an amine compound of the formula $R^1NH_2$ and an amine compound of the formula $R^1NHR^2$ in the range of from 0.003 to 0.3 mol of the organoboron nitride compound wherein $R^1$ and $R^2$ which may be the same or different individually represent a $C_{12}$ alkyl, a $C_{18}$ alkyl or an aryl group.

2. The process of claim 1 wherein $R^1$ or $R^2$ represents a lauryl or stearyl group.

3. The process of claim 1 wherein the polymerization is carried out in a solvent selected from the group consisting of aromatic hydrocarbons, ethers, tertiary amines and polar solvents.

4. The process of claim 1 wherein the polymerization is carried out at a temperature of 80° C. to 500° C.

5. The process of claim 2 wherein the polymerization is carried out in a solvent selected from the group consisting of aromatic hydrocarbons, ethers, tertiary amines and polar solvents.

6. The process of claim 2 wherein the polymerization is carried out at the temperature of 80° C. to 500° C.

7. The process of claim 3 wherein the polymerization is carried out at a temperature of 80° C. to 500° C.

8. The process of claim 5 wherein the polymerization is carried out at a temperature of 80° C. to 500° C.

* * * * *